United States Patent Office 2,944,067
Patented July 5, 1960

2,944,067

17-OXYGENATEDESTRA-2,5(10)-DIENES AND INTERMEDIATES

William F. Johns, Morton Grove, Ill., assignor to G. D. Searle & Co., Chicago, Ill., a corporation of Delaware No Drawing. Filed Mar. 24, 1959, Ser. No. 801,442

6 Claims. (Cl. 260—397.3)

The present invention relates to steroids in which the A ring has a diene structure and more particularly to 17-oxygenatedestra-2,5(10)-dienes and to intermediates for preparing same. The 17-oxygenatedestra-2,5(10)-dienes of this invention are represented by the structural formula

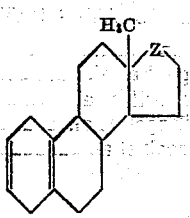

wherein Z is selected from the group consisting of carbonyl, hydromethylene and (lower alkanoyl) oxymethylene radicals. The radicals encompassed by the term "lower alkanoyl" are, for example, formyl, acetyl, propionyl, butyryl, valeryl, caproyl, enanthyl, caprylyl and the branched-chain isomers thereof; said groups being the acyl radicals of alkanoic acids containing less than 9 carbon atoms.

A suitable starting material for the manufacture of the compounds of this invention is estr-5(10)-en-3,17-dione. By reduction of this substance, for example with sodium borohydride, estr-5(10)-en-3β-ol-17-one is obtained. Treating the latter compound with p-toluenesulfonyl chloride results in 3β-(p-tolylsulfonyloxy)-estr-5(10)-en-17-one. The latter ester is converted to estra-2,5(10)-diene-17-one, for example by treatment with activated aluminum oxide. Reduction of the latter ketone, for example with lithium and liquid ammonia, affords estra-2,5(10)-dien-17-ol.

The 17-(lower alkanoyloxy)estra-2,5(10)-dienes of this invention can be prepared by treating estra-2,5 (10)-dien-17-ol in pyridine with an alkanoic acid anhydride. propionic anhydride and pyridine to yield 17-propionoxy-estra-2,5(10)-diene.

The 17-oxygenatedestra-2,5(10)-dienes of this invention are useful as a result of their valuable pharmacological properties. They have, for example, the capacity to decrease the serum concentration of cholesterol and the corresponding cholesterol: phospholipid ratio without at the same time producing the potent side effects characteristic of known estrogens adapted to regulation of cholesterol metabolism.

Estr-5(10)-en-3β-ol-17-one and 3β-(p-tolylsulfonyloxy)estr-5(10)-en-17-one, also compounds of this invention, are useful as intermediates in the manufacture of the instant 17-oxygenatedestra-2,5(10)-dienes, as has been shown supra.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples, temperatures are given in degrees centigrade (°C.). Quantities of materials are expressed in parts by weight except where otherwise noted.

EXAMPLE 1

*Estr-5(10)-en-3β-ol-17-one*

To a solution of 165 parts of estr-5(10)-ene-3,17-dione in 3200 parts of methanol is added, at 10–15°, a solution of 6.2 parts of sodium borohydride in 150 parts of water; and the mixture is stirred for 45 minutes. The reaction mixture is treated with 85 parts of acetic acid and the resultant solution poured into 8,000 parts of water. The resultant precipitate is collected by filtration, washed with water, dried, and dissolved in benzene. Chromatography of the benzene solution on 1700 parts of silica gel followed by elution with a 10% ethyl acetate-90% benzene solution and recrystallization from acetone-petroleum ether affords estr-5(10)-en-3β-ol-17-one, M.P. 192–194°; [α]$_D$=+270°. Its infrared absorption spectrum possesses maxima at 2.76 and 5.77 microns.

EXAMPLE 2

*3β-(p-tolylsulfonyloxy)estr-5(10)-en-17-one*

To a solution of 16.8 parts of estr-5(10)-en-3β-ol-17-one in 200 parts of pyridine is added, at 5°, 18 parts of p-toluenesulfonyl chloride. The resultant solution is allowed to stand at room temperature for 18 hours, then treated with aqueous sodium bicarbonate. The mixture is extracted with benzene and the benzene solution washed successively with dilute hydrochloric acid, water, aqueous sodium bicarbonate, and water; dried over anhydrous magesium sulfate; and evaporated to dryness in vacuo. Recrystallization of the residue from methanol yields 3β-(p-tolylsulfonyloxy)estr-5(10)-en-17-one, M.P. 135–137°; [α]$_D$=+182°. It possesses maxima in the infrared at 5.76 and 6.28 microns.

EXAMPLE 3

*Estra-2,5(10)-dien-17-one*

A solution of 21.2 parts of 3β-(p-tolylsulfonyloxy)estr-5(10)-en-17-one in 880 parts of benzene is passed over a column of 200 parts of activated alkaline aluminum oxide. The aluminum oxide has been activated according to the procedure described by Brockmann and Schodder (B. 74, 73 (1941)). Elution of the column with 880 parts of benzene, removal of the solvent, and recrystallization of the residue from methanol results in estra-2,5(10)-dien-17-one, M.P. 133–134°. It has a maximum in the infrared at 5.75 microns.

EXAMPLE 4

*Estra-2,5(10)-dien-17-ol*

To a stirred solution of 1 part of lithium wire and 25 parts of ethanol in 500 parts of liquid ammonia is added dropwise over a period of 5 minutes, a solution of 1.4 parts of estra-2,5(10)-dien-17-one in 25 parts of ethanol. An additional 2 parts of lithium wire is then added portionwise over a period of 1 hour. The ammonia is evaporated and the residue treated with ether and water. The ether solution is washed with water, dried over anhydrous magnesium sulfate, and concentrated under reduced pressure. Recrystallization of the residue from an acetone-petroleum ether solution affords estra-2,5(10)-dien-17β-ol, M.P. 139–141°; [α]$_D$=+131°. It possesses a maximum in the infrared at 3.02 microns.

The mother liquors from the above recrystallization are chromatographed on silica gel. Elution with 2% ethyl acetate in benzene affords estra-2,5(10)-dien-17α- ol which has a maximum in the infrared region at 3.02 microns.

EXAMPLE 5

17β-propionoxyestra-2,5(10)-diene

A mixture of 6.6 parts of estra-2,5(10)-dien-17β-ol, 150 parts of pyridine and 70 parts of propionic anhydride is heated on a steam bath for 20 minutes, cooled, and diluted with water. The resultant precipitate is collected by filtration, washed with water and dried. The crude product is recrystallized from ethanol to afford 17β-propionoxyestra-2,5(10)-diene, M.P. 88–90°. It possesses a maximum in the infrared at 5.77 microns.

By substituting estra-2,5(10)-dien-17α-ol and otherwise proceeding according to the herein described processes, 17α-propionoxyestra-2,5(10)-diene is obtained.

EXAMPLE 6

17β-caproyloxyestra-2,5(10)-diene

A mixture of 3 parts of estra-2,5(10)-dien-17β-ol, 75 parts of pyridine, and 70 parts of caproic anhydride is heated on a steam bath for 30 minutes. The reaction mixture is cooled and poured into 1500 parts of water. The crude product is collected by filtration, washed with water, dried and recrystallized from ethanol to afford 17β-caproyloxyestra-2,5(10)-diene. It possesses a maxima in the infrared at about 5.77 microns.

By substituting estra-2,5(10)-dien-17α-ol and otherwise proceeding according to the herein described processes, 17α-caproyloxyestra-2,5(10)-diene is obtained.

What is claimed is:

1. A compound of the structural formula

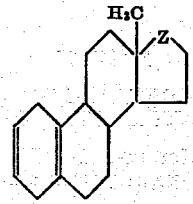

wherein Z is selected from the group consisting of carbonyl, hydroxymethylene, and (lower alkanoyl)oxymethylene radicals.
2. Estra-2,5(10)-dien-17-one.
3. Estra-2,5(10)-diene-17-ol.
4. 17-Propionoxyestra-2,5(10)-diene.
5. Estr-5(10)-en-3β-ol-17-one.
6. 3β-(p-tolylsulfonloxy)estr-5(10)-en-17-one.

References Cited in the file of this patent
UNITED STATES PATENTS

| | | |
|---|---|---|
| 2,729,654 | Colton | Jan. 3, 1956 |
| 2,806,030 | Ringold et al. | Sept. 10, 1957 |
| 2,846,452 | Campbell et al. | Aug. 5, 1958 |
| 2,878,267 | Szpilfogel et al. | Mar. 17, 1959 |
| 2,881,188 | Babcock et al. | Apr. 7, 1959 |

UNITED STATES PATENT OFFICE

CERTIFICATE OF CORRECTION

Patent No. 2,944,067                                       July 5, 1960

William F. Johns

It is hereby certified that error appears in the printed specification of the above numbered patent requiring correction and that the said Letters Patent should read as corrected below.

Column 1, line 52, before "propionic" insert -- For example, estra-2,5(10)-dien-17-ol is treated with --; column 2, line 35, for "magesium" read -- magnesium --.

Signed and sealed this 3rd day of January 1961.

(SEAL)

Attest:

KARL H. AXLINE
Attesting Officer

ROBERT C. WATSON
Commissioner of Patents